(12) United States Patent
Holger

(10) Patent No.: US 7,495,812 B2
(45) Date of Patent: Feb. 24, 2009

(54) PRINTING DEVICE USING COLOR PROFILE CALIBRATION AND METHOD FOR OPERATING A PRINTING DEVICE USING COLOR PROFILE CALIBRATION

(75) Inventor: Schuppan Holger, Bottrop (DE)

(73) Assignee: Electronics For Imaging, Inc., Foster City, CA (US)

(*) Notice: Subject to any disclaimer, the term of this patent is extended or adjusted under 35 U.S.C. 154(b) by 352 days.

(21) Appl. No.: 10/511,179

(22) PCT Filed: Apr. 7, 2003

(86) PCT No.: PCT/DE03/01136

§ 371 (c)(1),
(2), (4) Date: Feb. 15, 2006

(87) PCT Pub. No.: WO03/088642

PCT Pub. Date: Oct. 23, 2003

(65) Prior Publication Data

US 2006/0196378 A1    Sep. 7, 2006

(30) Foreign Application Priority Data

Apr. 15, 2002 (DE) ................... 102 16 669

(51) Int. Cl.
G03F 3/08 (2006.01)
H04N 1/46 (2006.01)

(52) U.S. Cl. ........................ 358/518; 358/504
(58) Field of Classification Search ........... None
See application file for complete search history.

(56) References Cited

U.S. PATENT DOCUMENTS 6,178,007 B1 * 1/2001 Harrington .................. 358/1.9
2002/0180996 A1 * 12/2002 Allen et al. .................. 358/1.9

FOREIGN PATENT DOCUMENTS

| EP | 0398502 A | 11/1990 |
| EP | 0854638 A | 7/1998 |
| EP | 1178670 A | 2/2002 |

* cited by examiner

Primary Examiner—Twyler L Haskins
Assistant Examiner—Barbara D Reinier
(74) Attorney, Agent, or Firm—Michael A. Glenn; Glenn Patent Group

(57) ABSTRACT

The invention relates to a printing device and a method of operating the printing device, it being possible for the following steps to be carried out: printing a calibration print by means of the printing device, the calibration print having a plurality of measuring areas with different colour mixture relationships, spectrophotometric measurement of the measuring areas, producing a colour profile, the spectrophotometric measurement of the measuring areas being carried out at a plurality (N) of measuring times ($T_n$), producing a colour profile which is extended by a description of the behaviour over time and which comprises a plurality of colour profiles in each case associated with a measuring time, and setting the colour mixture relationships of the printing device on the basis of the colour profile extended by a description of the behaviour over time.

40 Claims, 2 Drawing Sheets

Figures 1A, 1B:
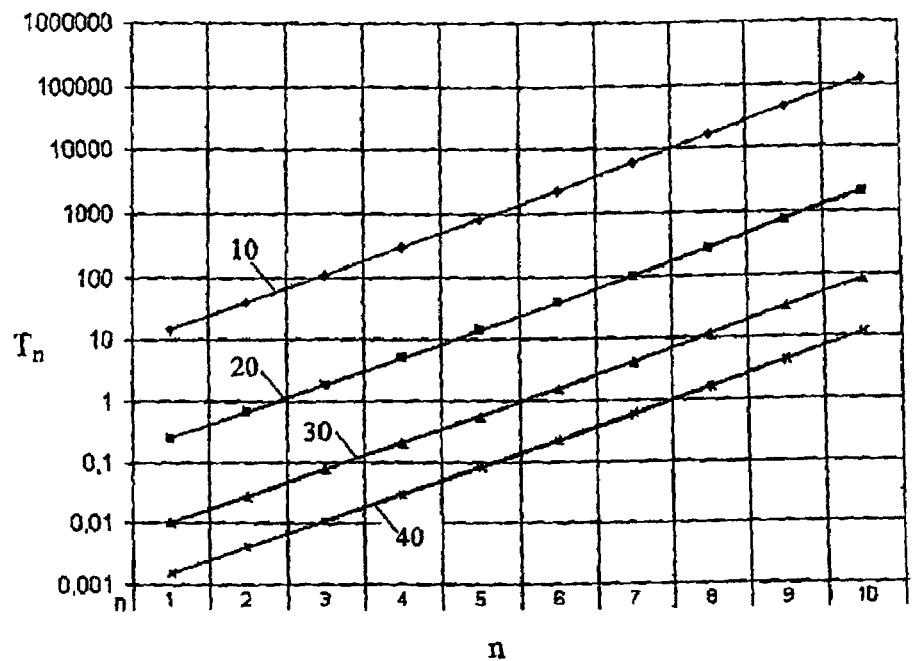

| Measurement n | 1 | 2 | 3 | 4 | 5 | 6 | 7 | 8 | 9 | 10 |
|---|---|---|---|---|---|---|---|---|---|---|
| minutes | 15 | 40,7742 | 110,836 | 301,269 | 818,972 | 2226,2 | 6051,43 | 16449,5 | 44714,4 | 121546 |
| hours | 0,25 | 0,67957 | 1,84726 | 5,02138 | 13,6496 | 37,1033 | 100,867 | 274,158 | 745,239 | 2025,77 |
| days | 0,01042 | 0,02832 | 0,07697 | 0,20922 | 0,56873 | 1,54597 | 4,20238 | 11,4233 | 31,0516 | 84,4071 |
| weeks | 0,00149 | 0,00405 | 0,011 | 0,02989 | 0,08125 | 0,22085 | 0,60034 | 1,63189 | 4,43595 | 12,0582 |

PRINTING DEVICE USING COLOR PROFILE CALIBRATION AND METHOD FOR OPERATING A PRINTING DEVICE USING COLOR PROFILE CALIBRATION

The invention relates to a printing device and a method of operating a printing device. In particular, the invention relates to a printing device and a method of operating a printing device taking account of a colour change depending on the time which has elapsed since the printing, by means of which obligatory measurement of colour values of the printing device can be carried out.

When prints are being prepared on printing devices, in particular inkjet printers, a stable, predictable and controllable ink behaviour is very important in many cases. This is the case in particular in the use in the simulation of printing presses and in fine art reproduction or the reproduction of photographs.

It is known to perform the adaptation of the colour behaviour via what is known as colour management. One example of this is formed by the use of what are known as ICC colour profiles established by the ICC (International Colour Consortium) in the printing industry. In this case, the colour behaviour of the printer on a specific material is described by printing out a specific number of measuring areas with different colour mixture relationships of the printer inks. These measuring areas are measured spectrophotometrically in order to determine the colour behaviour of the printer. The measured values obtained in the process are then stored in what is known as a colour profile, which reproduces the colour impression of the respective measuring area. By using this colour profile, it is possible for colour management software to determine that amount of the individual printer inks whose mixture on the measured material results in a desired colour impression. The individual colours used by the inkjet printer are then applied to the material to be printed in accordance with these mixture relationships.

In this case, however, the problem arises that the colours used in inkjet printers during printing react with the printed material and also with one another because of their chemical and microstructural properties. This also results in a change in the colour properties, which is most highly pronounced immediately after printing out. As has been verified by long-term tests, however, a significant change in the colour properties is also present after days and even weeks.

The deviation of the measured colour profiles from the ultimate colour impression can in no way be neglected, in particular during the first half an hour, for which reason the producers of colour management systems recommend waiting for at least 30 minutes before the measurement of the aforementioned measuring areas is carried out.

A further problem is that the above-described colour fluctuation neither runs linearly nor in any other way in a specific direction. It is therefore possible, for example, for the case to arise in which, from the time of the print-out, the deviation of the colour values from the final result initially becomes greater for a specific time period and then decreases slowly again until the colour values have finally largely stabilized. Because of this, the prints are initially kept for a certain time before they can be measured.

This problem is particularly serious in applications in which a reliable measurement is virtually impossible as a result of the colour fluctuations during drying. This includes, for example, colour measurement directly during printing, which is desirable, for example, for on-line monitoring of the printing process.

Each arrangement of a colour measuring instrument directly on the printer can carry out only a relative measurement. The result of this relative measurement normally deviates sharply from the result of a measurement carried out in the same area a specific time period after the printing process, so that reliable statements using measured results which have been obtained during or immediately after printing are problematical.

The problem of a lack of agreement between colour measurement results is particularly serious in the following cases:
  a) if mutually different combinations of printer, ink and material are concerned, for example because of different manufacturers or different technologies (e.g. "piezo" versus "bubblejet");
  b) if, as a result of the constructional arrangement of the measuring instrument in or on the printer, different time periods elapse between printing and measurement;
  c) if a difference in the time of the measurement after the printing is based on the dependence on the contents of the printing data (hi/low resolution, slow/fast printing mode, different dimensions of the image and, as a result, different printing time). This is the case, for example, when the measuring instrument is arranged on the printer but not on the print head itself.

It is therefore an object of the present invention to provide a method of operating a printing device and also a printing device in which the abovementioned disruptive influences are eliminated to the greatest possible extent during the adaptation of the colour behaviour.

This object is achieved according to the features of the independent Claim 1.

For this purpose, a method of operating a printing device comprises the following steps:
  printing a calibration print by means of the printing device, the calibration print having a plurality of measuring areas with different colour mixture relationships;
  spectrophotometric measurement of the measuring areas, producing a colour profile, the spectrophotometric measurement of the measuring areas being carried out at a plurality of measuring times, producing a colour profile which is extended by a description of the behaviour over time and which comprises a plurality of colour profiles in each case associated with a measuring time; and
  setting the colour mixture relationships of the printing device on the basis of the colour profile extended by a description of the behaviour over time.

By measuring the colour values at regular time intervals after printing, the colour behaviour over time is characterized and this characteristic is added in a suitable way to the "normal" colour profile. In this, way, from a colour measurement and the knowledge of the time difference between printing and measurement, it becomes possible to calculate the colour values at any other desired time. In practical terms, this other time should be so long after printing that there are no longer any colour changes worth mentioning, the colour is therefore stable.

In this way, it becomes possible for the first time to compare with one another measured results which have been measured at different times following printing and/or have been created with different combinations of printer, ink and material and have been measured before stabilization of the colour. This is possible in that, by using the time characteristic, all the measured values are converted to a time at which the colour values have stabilized. In particular, by means of the method according to the invention, it therefore also becomes possible to achieve reliable results in the case of on-line monitoring of a printing process.

According to a preferred embodiment, the measuring times of the plurality of measuring times, that is to say their time intervals, are chosen such that the time interval between successive measuring times increases with the time since the calibration print was printed out. The plurality of measuring times is preferably chosen such that the time interval between successive measuring times exhibits a logarithmic dependence on the time since the calibration print was printed out, preferably in accordance with the natural logarithmic function ("logarithmus naturalis"=ln). In this way, firstly the highest possible accuracy during the initial time period during which the measured colour profiles vary relatively sharply over time is ensured. Secondly, by means of a relatively low number of measurements at a relatively large time interval from the calibration print, it is ensured that only the least possible storage space is needed for the total number of measured colour profiles.

The colour profile extended by a description of the behaviour over time preferably has the colour profiles produced at the individual measuring times in each case with a time index which is greater the shorter the time since the calibration print was printed out.

According to a further preferred embodiment, before the setting of the colour mixture relationships by using the colour profiles associated with the individual measuring times and belonging to the colour profile extended by a description of the behaviour over time, further colour profiles at times other than those actually measured are determined by extrapolation and/or interpolation. In this way, future colour values of a print, that is to say the colour impression brought about by the print, can be predicted as a function of time.

According to a further preferred embodiment, colour mixture relationships of the printing device are set by using the extended colour profile in such a way that, after a specific time period has elapsed, predetermined colour values of the print are obtained. In this way, an optimal print can be produced, taking into account the change over time explained above of the colour impression.

According to a further preferred embodiment, the age of a print is determined by measuring a colour profile of the print and calculating the associated colour value by using the extended colour profile.

The printing device chosen is preferably a colour inkjet printer.

In a printing device according to the present invention, colour mixture relationships of the printing device can be set by means of a colour profile which is produced by spectrophotometric measurement of measuring areas of a calibration print having a plurality of measuring areas with different colour mixture relationships, the means for spectrophotometric measurement being designed such that the spectrophotometric measurement of the measuring areas can be carried out at a plurality of measuring times, producing a colour profile which is extended by a description of the behaviour over time and which comprises a plurality of colour profiles in each case associated with a measuring time, and wherein said colour mixture relationships of the printing device are adjustable on the basis of the colour profile extended by a description of the behaviour over time.

Further refinements of the invention can be gathered from the description and the subclaims.

Figure 2:
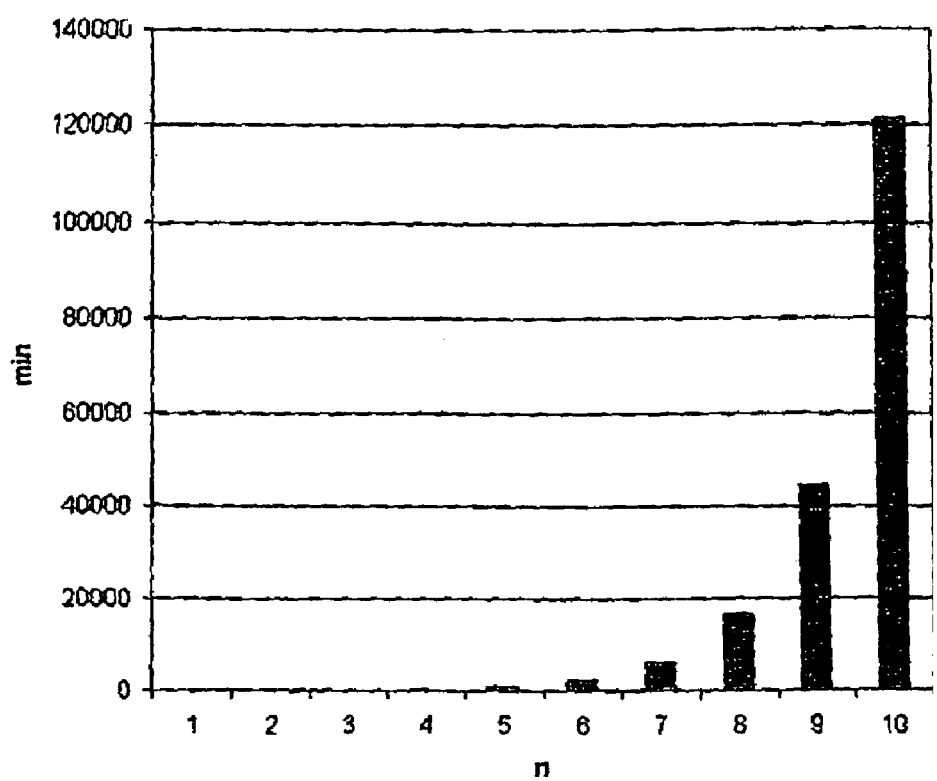

The invention will be explained in more detail below using an exemplary embodiment illustrated in the appended figures, in which:

FIG. 1 shows a graphical representation of measuring times $T_n$ of successive measurements n (n=1, . . . 10) of colour profiles to produce an extended colour profile according to a preferred exemplary embodiment of the method according to the invention in a single-logarithmic plot (FIG. 1*a*) and a tabular listing of these measuring times $T_n$ (FIG. 1*b*), in each case for $T_n = 15 \cdot e^{n-1}$, n=1, . . . 10; and FIG. 2 shows the measuring times $T_n$ of successive measurements n of colour profiles from FIG. 1 in a linear plot.

At the start of the method according to the invention, a calibration print is printed out in a known way by means of a printer, the calibration print comprising a plurality of measuring areas with different colour mixture relationships. The method is suitable in particular for the obligatory measurement of colour values on colour inkjet printers, but can also be used for laser printers, for example.

In a next step, the individual measuring areas of the calibration print are measured spectrophotometrically, a colour profile being produced which, for each colour mixture relationship, comprises the colour impression produced in the form of a spectral value. The mixture relationships are preferably specified on the basis of what are known as the four process colours cyan, magenta, yellow and black. However, mixture relationships based on more or fewer colours, in particular including only black and white, can also be used.

The colour profile can be drawn up in particular as an ICC colour profile, which substantially comprises two tables. In a first table of the ICC colour profile, for each of the colour mixture relationships CMYK present in the individual measuring areas, the associated colour value in the Lab colour space Lab=Lab(CMYK) is specified. For each colour value Lab, a second table specifies the colour mixture relationship CMYK needed to produce this colour value, on the basis of predetermined reference points of the inverse mathematical function CMYK=CMYK (Lab).

The spectrophotometric measurement of the measuring areas is carried out repeatedly at measuring times at predetermined time intervals. In this case, at each measuring time in each case a colour profile associated with this measuring time is produced.

According to the exemplary embodiment illustrated in FIG. 1 and FIG. 2, these measuring times are chosen such that the time intervals between the measuring times increase logarithmically as a function of the time since the time at which the calibration print of the printer was completed, specifically preferably in accordance with the function $$T_n = k \cdot e^{n-1}, (n=1, \ldots, N; k=\text{const.}) \tag{1}$$

where $T_n$ designates the time period (in minutes) until the nth measurement, N designates the total number of measurements carried out in order to produce the extended colour profile, and k designates a linear correction factor.

In order to obtain a suitable relation between the size of the file produced for the extended colour profile, on one hand, and the number of measured values on which subsequent interpolation or extrapolation is based, a value approximately of the order of magnitude of ten should preferably be chosen for the total number N of measuring points.

If, furthermore, the time period $T_n$ until the chronologically last measurement (n=10) is defined as a suitable value of $T_{10}$=12 weeks=120960 minutes (such a time period corresponds approximately to the minimum keeping time normally required for a colour proof), then, according to the illustration in FIG. 1*a*, given a logarithmic plot of $T_n$ versus n (with n=1, . . . 10), a linear representation is obtained if the linear correction factor $k = 120960/e^{10-1} \approx 15$ is chosen, so that the result is the relationship $T_n = 15 \cdot e^{n-1}$ (n=1, . . . , N; k=const.).

In this case, according to FIG. 1a, the graphs shown in the single-logarithmic plot (that is to say with a logarithmic division of the $T_n$ axis) specify the respective time period $T_n$ in minutes (graph 10), hours (graph 20), days (graph 30) and weeks (graph 40). The associated values $T_n$ for the individual measurements n=1, ..., 10 are listed in tabular form in FIG. 1b.

As can be seen from the plot selected in FIG. 2, likewise for the abovementioned formula, the time periods between the individual measurements increase as the time from the chronologically first measurement (n=1) increases, that is to say the starting time at which the calibration print was completed.

Because of the division of the timescale for the measuring points to be set for the colour profiles in accordance with Equation (1), that is to say in accordance with the natural logarithm function, account is taken of the fact that the colour change of the inks used on the printed material is at its most pronounced directly after the calibration print and subsequently slows. By means of a logarithmic arrangement of the individual measuring times, firstly a higher accuracy is ensured in the time period directly following the production of the calibration print and, at the same time, by selecting larger time intervals between the measuring times in the chronological range of greater stability, the necessary storage space is minimized.

Alternatively, but less preferably, instead of the above division of the timescale for the individual measurements of the colour profiles, another nonlinear division of the timescale for the measuring points to be set can be chosen. Possible in principle, but less suitable because of the steeper rise of the function, is also a division of the timescale in accordance with the decimal logarithm $T_n = k \cdot 10^{n-1}$ (with n=1, 2, ..., N), a measurement of the respective colour profile then being carried out after one minute (n=1), 10 minutes (n=2), 100 minutes (n=3), 1000 minutes (n=4), etc.

Following completion of the measurements of the individual colour profiles at the respective measuring times $T_n$ (with n=1, ... 10), the colour profiles produced at each measuring time are combined to form a colour profile which is extended by a description of the behaviour over time and which comprises the time period which has elapsed since the calibration print was completed as a further dimension in an additional address region.

In this case, the individual colour profiles are preferably stored with a time index which is greater the shorter the time since the completion of the calibration print by the printer. The table section with the highest time index therefore corresponds to the first spectrophotometric measurement prepared after the completion of the calibration print, while the chronologically last measurement is stored with the time index zero.

This form of extended colour profile has the advantage that the extended colour profile can also be processed by means of a conventional method sequence developed for the interpretation of ICC profiles without a timescale. In this case, the values of the extended colour profile which have been stored with the time index zero are preferably used, since these values correspond to the best approximation to he time at which the colour values are largely constant.

Following the completion of the extended colour profile, the latter is used for carrying out colour management, that is to say the setting of the colour mixture relationships of the printer is carried out on the basis of the colour profile extended by a description of the behaviour over time.

By means of the extended colour profile, it is also possible for those colour values which are achieved on the same system at any other arbitrary time to be calculated in a straightforward manner. This may be achieved by means of interpolation with adjacent reference points from colour values which have been measured at a specific time, by using the extended colour profile. During this interpolation, the individual colour profiles present in the extended colour profile are weighted in accordance with the logarithmic dependence on the measured points, that is to say in accordance with Equation (1), in order to calculate the colour value sought. For example, a colour value to be expected at a time $T_x$ with $T_7 < T_x < T_8$ can be determined with appropriate weighting of the colour values $Lab(T_7)$ and $Lab(T_8)$ measured at the times $T_7$ and $T_8$.

Furthermore, the age of a print can be determined by using the extended colour profile in that, by measuring a colour profile of the print and calculating the associated colour value $Lab(T_y)$, the corresponding time period $T_y$ which has elapsed since the completion of the print is determined by using the extended colour profile (for example by comparison with a colour value stored therein at a different time, for example $T_N$ or the colour value for $t \to \infty$).

In addition, as early as when producing a print, account can be taken of the problem of the change of the colour values over time by the mixture relationship already being chosen at the time of the print-out by using the extended colour profile in such a way that a desired colour value $Lab(T_z)$ is obtained after a predetermined time interval $T_z$ has elapsed.

Furthermore, it becomes possible to compare colour measurement results of prints on various printers with one another, to be specific irrespective of how much time has elapsed between the print-out and the measurement. In particular, the colour values from various printers which have been measured at different times after the print-out can be calculated back to a common time base and compared in this way. This makes it possible in particular to obtain reliable statements about the printing behaviour by means of on-line monitoring of the printing process.

The invention claimed is:

1. Method of operating a printing device, which comprises the following steps:
   printing a calibration print by means of the printing device, the calibration print having a plurality of measuring areas each with different colour mixture relationships;
   spectrophotometric measurement of the measuring areas, producing from the measurement results a colour profile, the spectrophotometric measurement being carried out at a plurality (N) of measuring times ($T_n$), wherein the measuring times ($T_n$) are chosen such that the time interval between successive measuring times increases with the time since the calibration print was printed out;
   wherein said color profile is produced as an extended colour profile which comprises a description of the behaviour over time of the calibration print:
   wherein the extended colour profile comprises a plurality of color profiles each being associated with a measuring time ($T_n$); and
   setting the colour mixture relationships of the printing device on the basis of the extended colour profile.

2. Method according to claim 1, the plurality (N) of measuring times ($T_n$) being chosen such that the time interval between successive measuring times exhibits a logarithmic dependence on the time since the calibration print was printed out.

3. Method according to claim 2, a natural logarithmic function being chosen as the logarithmic dependence.

4. Method according to claim 1, wherein the colour profile extended by a description of the behaviour over time having the colour profiles produced at the individual measuring times ($T_n$) in each case with a time index which is greater the shorter the time since the calibration print was printed out.

5. Method according to claim 1, further comprising determining additional colour profiles by extrapolation and/or interpolation.

6. Method according to claim 1, wherein colour mixture relationships of the printing device being set by using the extended colour profile in such a way that, after a specific time period has elapsed, predetermined colour values of the print are obtained.

7. Method according to claim 1, wherein the age of a print being determined by measuring a colour profile of the print and calculating the associated colour value by using the extended colour profile.

8. Method according to claim 1, wherein a colour inkjet printer being chosen as the printing device.

9. Printing device in which colour mixture relationships of the printing device can be set by means of a colour profile, said printing device comprising means for spectrophotometric measurement of measuring areas of a calibration print having a plurality of measuring areas with different colour mixture relationships for producing the colour profile,
the means for spectrophotometric measurement being designed such that the spectrophotometric measurement of the measuring areas can be carried out at a plurality (N) of measuring times ($T_n$), producing a colour profile which is extended by a description of the behaviour over time and which comprises a plurality of colour profiles each being associated with a measuring time ($T_n$), and such that the time interval between successive measuring times increases with the time since the calibration print was printed out; and
said colour mixture relationships of the printing device are being adjustable on the basis of the colour profile extended by a description of the behaviour over time.

10. Printing device according to claim 9, the means for spectrophotometric measurement being designed such that the time interval between successive measuring times exhibits a logarithmic dependence on the time since the calibration print was printed out.

11. Printing device according to claim 10, the logarithmic dependence being described by a natural logarithmic function.

12. Printing device according to claim 9, the printing device being a colour inkjet printer.

13. Printing device according to claim 9, the printing device being a colour inkjet printer.

14. Printing device according to claim 10, the printing device being a colour inkjet printer.

15. Printing device according to claim 11, the printing device being a colour inkjet printer.

16. Method according to claim 1, wherein the colour profile extended by a description of the behaviour over time having the colour profiles produced at the individual measuring times ($T_n$) in each case with a time index which is greater the shorter the time since the calibration print was printed out.

17. Method according to claim 2, wherein the colour profile extended by a description of the behaviour over time having the colour profiles produced at the individual measuring times ($T_n$) in each case with a time index which is greater the shorter the time since the calibration print was printed out.

18. Method according to claim 3, wherein the colour profile extended by a description of the behaviour over time having the colour profiles produced at the individual measuring times ($T_n$) in each case with a time index which is greater the shorter the time since the calibration print was printed out.

19. Method according to claim 1, further comprising determining additional colour profiles by extrapolation and/or interpolation.

20. Method according to claim 2, wherein before the setting of the colour mixture relationships by using the colour profiles associated with the individual measuring times ($T_n$) and belonging to the colour profile extended by a description of the behaviour over time, further colour profiles at times other than those actually measured being determined by extrapolation and/or interpolation.

21. Method according to claim 3, further comprising determining additional colour profiles by extrapolation and/or interpolation.

22. Method according to claim 4, further comprising determining additional colour profiles by extrapolation and/or interpolation.

23. Method according to claim 1, wherein colour mixture relationships of the printing device being set by using the extended colour profile in such a way that, after a specific time period has elapsed, predetermined colour values of the print are obtained.

24. Method according to claim 2, wherein colour mixture relationships of the printing device being set by using the extended colour profile in such a way that, after a specific time period has elapsed, predetermined colour values of the print are obtained.

25. Method according to claim 3, wherein colour mixture relationships of the printing device being set by using the extended colour profile in such a way that, after a specific time period has elapsed, predetermined colour values of the print are obtained.

26. Method according to claim 4, wherein colour mixture relationships of the printing device being set by using the extended colour profile in such a way that, after a specific time period has elapsed, predetermined colour values of the print are obtained.

27. Method according to claim 5, wherein colour mixture relationships of the printing device being set by using the extended colour profile in such a way that, after a specific time period has elapsed, predetermined colour values of the print are obtained.

28. Method according to claim 1, wherein the age of a print being determined by measuring a colour profile of the print and calculating the associated colour value by using the extended colour profile.

29. Method according to claim 2, wherein the age of a print being determined by measuring a colour profile of the print and calculating the associated colour value by using the extended colour profile.

30. Method according to claim 3, wherein the age of a print being determined by measuring a colour profile of the print and calculating the associated colour value by using the extended colour profile.

31. Method according to claim 4, wherein the age of a print being determined by measuring a colour profile of the print and calculating the associated colour value by using the extended colour profile.

32. Method according to claim 5, wherein the age of a print being determined by measuring a colour profile of the print and calculating the associated colour value by using the extended colour profile.

33. Method according to claim 6, wherein the age of a print being determined by measuring a colour profile of the print and calculating the associated colour value by using the extended colour profile.

34. Method according to claim 1, wherein a colour inkjet printer being chosen as the printing device.

35. Method according to claim 2, wherein a colour inkjet printer being chosen as the printing device.

36. Method according to claim 3, wherein a colour inkjet printer being chosen as the printing device.

37. Method according to claim 4, wherein a colour inkjet printer being chosen as the printing device.

38. Method according to claim 5, wherein a colour inkjet printer being chosen as the printing device.

39. Method according to claim 6, wherein a colour inkjet printer being chosen as the printing device.

40. Method according to claim 8, wherein a colour inkjet printer being chosen as the printing device.

\* \* \* \* \*